US011979698B2

(12) United States Patent
Jeong

(10) Patent No.: US 11,979,698 B2
(45) Date of Patent: May 7, 2024

(54) WASHBASIN HAVING SOUND FUNCTION

(71) Applicant: Yoocheon Jeong, Incheon (KR)

(72) Inventor: Yoocheon Jeong, Incheon (KR)

(*) Notice: Subject to any disclaimer, the term of this patent is extended or adjusted under 35 U.S.C. 154(b) by 67 days.

(21) Appl. No.: 17/800,888

(22) PCT Filed: Apr. 21, 2021

(86) PCT No.: PCT/KR2021/005011

§ 371 (c)(1),
(2) Date: Aug. 18, 2022

(87) PCT Pub. No.: WO2021/215820

PCT Pub. Date: Oct. 28, 2021

(65) Prior Publication Data

US 2023/0083023 A1 Mar. 16, 2023

(30) Foreign Application Priority Data

Apr. 24, 2020 (KR) ........................ 10-2020-0049678

(51) Int. Cl.
*H04R 1/02* (2006.01)
*E03C 1/182* (2006.01)

(52) U.S. Cl.
CPC ............. *H04R 1/028* (2013.01); *E03C 1/182* (2013.01)

(58) Field of Classification Search
CPC ........................................................ H04R 1/02
See application file for complete search history.

(56) References Cited

U.S. PATENT DOCUMENTS

2009/0094741 A1* 4/2009 Valadez .................. E03C 1/186 4/658
2020/0199858 A1* 6/2020 Eilmus ...................... E03C 1/18

FOREIGN PATENT DOCUMENTS

JP 07-048146 Y2 11/1995
JP 2003-135296 A 5/2003
KR 20-0163477 Y1 2/2000
KR 20-0351553 Y1 5/2004
KR 20-2010-0013058 U 12/2010
KR 10-2017-0085845 A 7/2017
KR 10-2020-0008206 A 1/2020

OTHER PUBLICATIONS

International Search Report for PCT/KR2021/005011 dated Jul. 28, 2021 from Korean Intellectual Property Office.

* cited by examiner

*Primary Examiner* — Christine J Skubinna
(74) *Attorney, Agent, or Firm* — Revolution IP, PLLC

(57) ABSTRACT

The present invention relates to a washbasin having a sound function, in which a concave space part accommodating water is formed at a center of an upper surface of a washbasin body, a valve is installed at a center of the concave space part, and a faucet is installed on an upper surface of a rear side of the washbasin body.

3 Claims, 2 Drawing Sheets

【Figure 1】
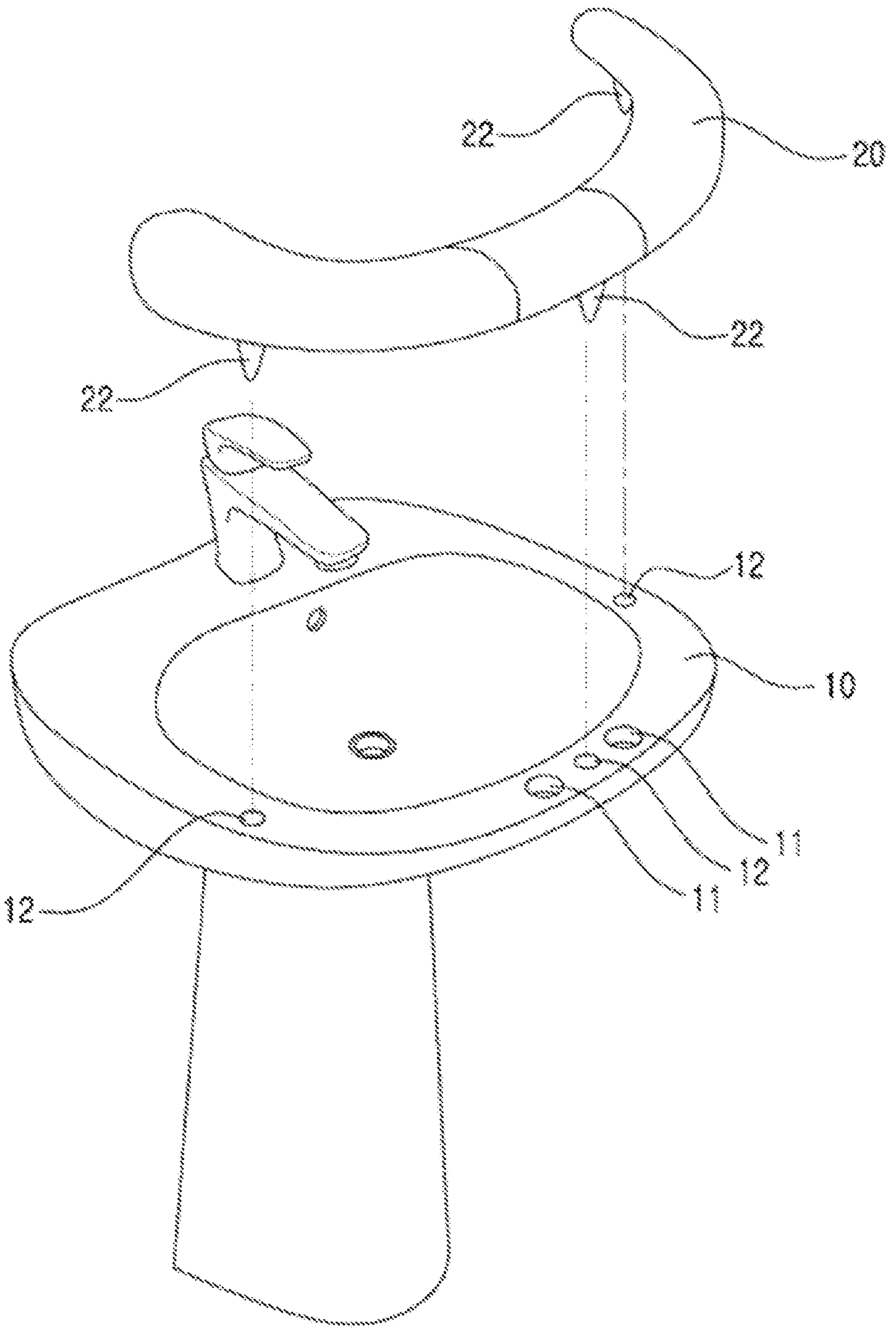

【Figure 2】
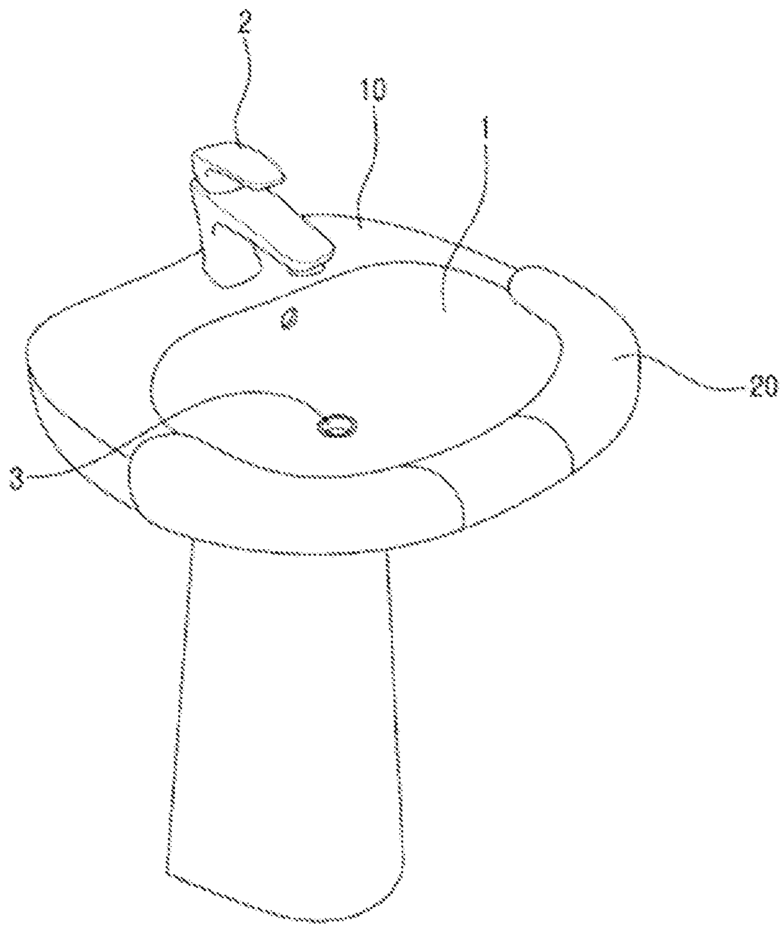
【Figure 3】
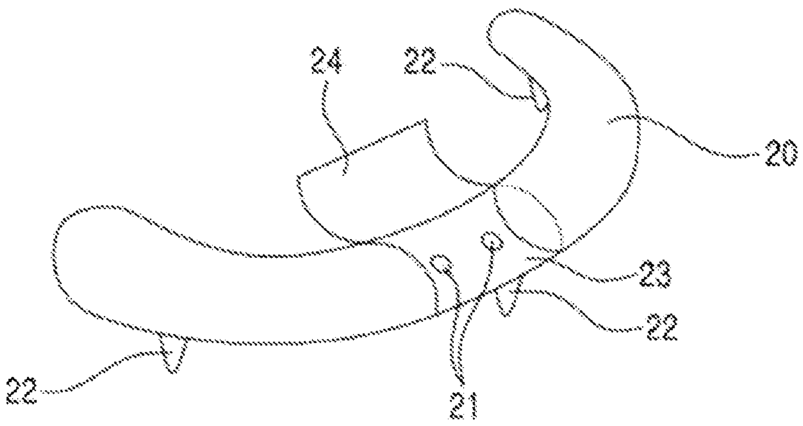

WASHBASIN HAVING SOUND FUNCTION

CROSS REFERENCE TO PRIOR APPLICATIONS

This application is the 35 U.S.C. 371 national stage of International application PCT/KR2021/005011 filed on Apr. 21, 2021; which claims priority to Korean Patent Application No. 10-2020-0049678 filed on Apr. 24, 2020. The entire contents of each of the above-identified applications are hereby incorporated by reference.

TECHNICAL FIELD

The present invention relates to a washbasin having a sound function, and more particularly, to a washbasin additionally having a sound function in addition to a unique function of the washbasin.

BACKGROUND ART

With the development of toilet culture, the toilet is changing into a place that serves as a resting place, and the time to use the toilet is also increasing due to the need for toilet, wash, and shower.

However, while using the toilet for a long time, such as showering, bathing, washing face, or brushing teeth, it is easy to feel bored because of not being able to listen to music, and women are sensitive to sound and are embarrassed by the sound of the toilet after the toilet.

Music can be played using a speaker on a smartphone itself, but the smartphone may get wet due to the use of water in the bathroom, and in the case of the smartphone's own speaker, there is a problem in that there is a problem of lowering sound quality if the music is greatly turned on the music due to lack of output. However, if putting the Bluetooth speaker in the bathroom, there is a risk of water dripping onto the speaker due to water use such as washing or showering.

Thus, in order to solve this problem in the prior art, various techniques for equipping a bathroom with sound facilities such as speakers have been developed.

Korean Utility Model Registration No. 0351553 relates to a washbasin which puts a digital audio device for the bathroom in a waterproof case and uses the digital audio device by fixing the digital audio device on a bathroom wall to listen to music or study a language even in a bathroom environment, thereby enhance a cultural environment of the bathroom and satisfy diverse needs of users.

However, since the present invention is to use an expensive audio device in a fixed installation, it is not economical, and the user cannot conveniently operate the audio device wirelessly through a smartphone, and sound is leaked through small apertures of the waterproof case, and as a result, the music is heard not to be clear and loud.

Further, Korean Patent Unexamined Publication No. 2020-008206 relates to a Bluetooth speaker which is usable in the bathroom which allows a user to listen to a call or music through the speaker and has a rectangular box shape.

However, a product according the invention has a disadvantage in that the product should be placed in a narrow bathroom space, which takes up a space and clutters the interior of the bathroom, and requires separate waterproof treatment, and a waterproof speaker has a disadvantage in that manufacturing cost is large and a volume become large.

DISCLOSURE

Technical Problem

The present invention is contrived to solve the problem in the prior art, and an object of the present invention is to provide a washbasin which can hear music by using a smartphone Bluetooth function when using a bathroom, and create a more wonderful bathroom atmosphere by applying various colors and designs.

Technical Solution

In order to achieve the object, according to the present invention, in a washbasin having a sound function in which a concave space part accommodating water is formed at a center of an upper surface of a washbasin body, a valve is installed at a center of the concave space part, and a faucet is installed on an upper surface of a rear side of the washbasin body, a speaker receiving pad is coupled onto an upper surface of a front portion of the washbasin body to cover an upper surface of a front portion of the washbasin body surrounding a front periphery of the concave space part, a sound hole formed to penetrate in a vertical direction is provided at a fore-end portion of the washbasin body so that a speak sound is discharged, a speaker receiving part having a space capable of putting a speaker is provided at an upper portion of a place where the sound hole is located in the speaker receiving pad, and a sound discharge hole is formed on a bottom portion of the speaker receiving part to communicate with the sound hole, and a cover forming an upper surface of the speaker receiving part is configured to be opened or closed.

Further, preferably, multiple coupling protrusions protrude downward on a bottom surface of the speaker receiving pad, and a coupling hole is formed in the washbasin body so that the coupling protrusion is enabled to be inserted.

Further, preferably, the speaker receiving pad is made of silicon rubber.

Advantageous Effects

As described above, by a washbasin having a sound function according to the present invention, music can be heard by using a smartphone Bluetooth function when using a bathroom, so embarrassment can be reduced by playing the music when using the bathroom and a user can take a shower in a pleasant atmosphere while hearing the music when showing, and a speak sound can be discharged only through a lower hole of the washbasin, and water is prevented from being dripped to prevent the water from pouring into a speaker when showing or washing a face, and silicon pads having various colors and designs are attached to the washbasin to create a more wonderful bathroom atmosphere.

DESCRIPTION OF DRAWINGS

FIG. 1 is an exploded perspective view illustrating a washbasin having a sound function according to the present invention.

FIG. 2 is a combination perspective view illustrating a washbasin having a sound function according to the present invention.

FIG. 3 is a perspective view illustrating a speaker receiving pad according to the present invention.

BEST MODE

Hereinafter, a specific embodiment of the present invention will be described in detail with reference to the accompanying drawings.

FIGS. 1 to 4 are perspective views illustrating a washbasin having a sound function according to the present invention.

The washbasin having a sound function according to the present invention is configured to include a washbasin body 10, a sound hole 11, a coupling hole 12, a speaker receiving pad 20, a sound discharge hole 21, a coupling protrusion 22, a speaker receiving part 23, and a cover 24.

The washbasin according to the present invention has the same configuration as a conventional washbasin in that a concave space part 1 accommodating water is formed at a center of an upper surface of the washbasin body 10, a valve 3 is installed at the center of the concave space part 1, and a faucet 2 is installed on the upper surface of a rear side of the washbasin body 10, but is different from the conventional washbasin in that the sound hole 11 and the coupling hole 12 are drilled.

Two sound holes 11 are formed to be adjacent to each other on the left and right, and formed to penetrate in a vertical direction, and serve to allow a speak sound to be discharged to the outside to allow music to be well heard.

A total of three coupling holes 12 are provided at a left end portion and a right end portion on the upper surface, and a portion located between a pair of sound holes 11. The coupling hole 12 is a hole which is drilled vertically downward from the upper surface of the washbasin body 10.

The speaker receiving pad 20 is laid and coupled onto the washbasin body 10 so as to cover a front portion on the upper surface of the washbasin body 10, and is made of silicon rubber.

The speaker receiving pad 20 is elongated from side to side and an arc shape, and preferably has a size and a shape so as to cover a front portion on the upper surface of the washbasin body 10, i.e., a portion circularly surrounding the concave space part 1 on the front.

The coupling protrusion 22 which protrudes downward is coupled to at a position on the bottom surface of the speaker receiving pad 20, which corresponds to the coupling hole 12, and multiple coupling protrusions 22 are inserted and coupled into multiple coupling holes 12 one to one to couple the speaker receiving pad 20 to the washbasin body 10.

The speaker receiving part 23 is provided at a frontmost portion of the speaker receiving pad 20, which forms a space capable of keeping the speaker. An internal space of the speaker receiving part 23 is formed to be further recessed than other portions of the speaker receiving pad 20, and the cover 24 covering the space from the top is hinge-coupled to insert or remove the speaker by opening the cover 24, and perform a waterproof function so as to prevent the water from entering the speaker by closing the cover 24.

Further, the sound discharge hole 21 is formed on the bottom of the speaker receiving part 23 so as to communicate with the sound hole 11, and as a result, a sound output from the speaker received by the speaker receiving part 23 sequentially passes through the sound discharge hole 21 and the sound hole 11 so that the sound goes out to toward the bottom to be heard outside.

A part of the speaker is exposed to the outside through the sound hole 11 of the washbasin body 10, but the sound hole 11 and the sound discharge hole 21 face downward toward the bottom surface, so there may be no possibility that the water will be poured or flow inside the speaker receiving part 23 through the sound hole 11 and the sound discharge hole 21.

In the present invention, the speaker is preferably the Bluetooth speaker, but any speaker using short-range wireless communication technology may be used.

When the user uses the toilet, the music can be played through the Bluetooth speaker contained in the speaker receiving part 23 by manipulating the smartphone, and when taking a shower or bath, the user can take the shower or bath by placing the smartphone at a site where there is no risk of water splashing or outside the bathroom while the music is played through the Bluetooth speaker using the smartphone, and in the case of a smartphone having a waterproof function, the user can control actuation of the Bluetooth speaker by manipulating the smartphone even while taking the bath.

As in the above description, only preferable specific examples the present invention has been described, but it will be apparent to those skilled in the art that various transforms and modifications in a technical spirit scope of the present invention can be made based on the specific examples, and it is natural that the transforms and modifications belong to the appended claims.

EXPLANATION OF REFERENCE NUMERALS

1: Concave space part 2: Faucet
3: Valve 10: Washbasin body
11: Sound hole 12: Coupling hole
20: Silicon pad 21: Sound discharge hole
22: Coupling protrusion 23: Speaker receiving part
24: Cover

The invention claimed is:

1. A washbasin having a sound function, in which a concave space part accommodating water is formed at a center of an upper surface of a washbasin body, a valve is installed at a center of the concave space part, and a faucet is installed on an upper surface of a rear side of the washbasin body, wherein a speaker receiving pad is coupled onto an upper surface of a front portion of the washbasin body to cover an upper surface of a front portion of the washbasin body surrounding a front periphery of the concave space part, a sound hole formed to penetrate in a vertical direction is provided at a fore-end portion of the washbasin body so that a speak sound is discharged, a speaker receiving part having a space capable of putting a speaker is provided at an upper portion of a place where the sound hole is located in the speaker receiving pad, and a sound discharge hole is formed on a bottom portion of the speaker receiving part to communicate with the sound hole, and a cover forming an upper surface of the speaker receiving part is configured to be opened or closed.

2. The washbasin having a sound function of claim 1, wherein multiple coupling protrusions protrude downward on a bottom surface of the speaker receiving pad, and a coupling hole is formed in the washbasin body so that the coupling protrusion is enabled to be inserted.

3. The washbasin having a sound function of claim 1, wherein the speaker receiving pad is made of silicon rubber.

* * * * *